*W. J. Lippincott,*

*Grinding and Polishing Saws.*

Nº 50,606. Patented Oct. 24, 1865.

Witnesses: F. M. Magee, Jas. O'Hara

Inventor: Wm. J. Lippincott, by his attorney W. Bakewell

UNITED STATES PATENT OFFICE.

WILLIAM J. LIPPINCOTT, OF PITTSBURG, PENNSYLVANIA.

IMPROVEMENT IN GRINDING AND POLISHING SAWS.

Specification forming part of Letters Patent No. 50,606, dated October 24, 1865.

*To all whom it may concern:*

Be it known that I, WILLIAM J. LIPPINCOTT, of the city of Pittsburg, in the county of Allegheny and State of Pennsylvania, have invented a new and useful Improvement in Machines for Grinding and Polishing Saws, which is also applicable to grinding and polishing plates or sheets of steel or other metals; and I do hereby declare the following to be a full, clear, and exact description thereof, reference being had to the annexed drawings, forming part of this specification, in which—

Figure 1:
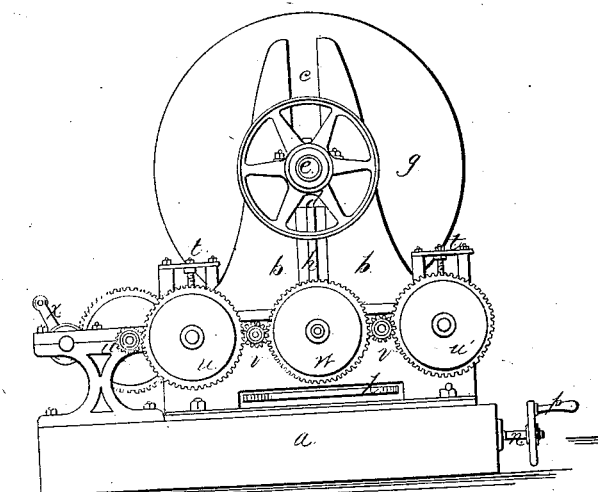
Figure 2:
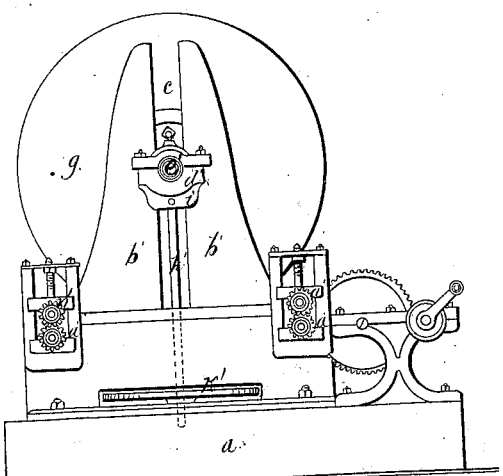
Figure 3:
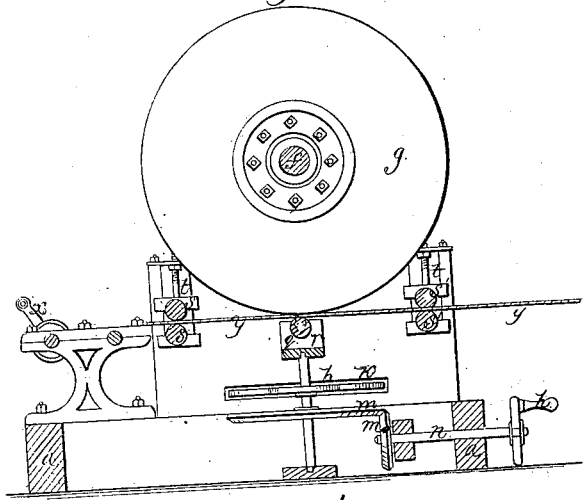
Figure 4:
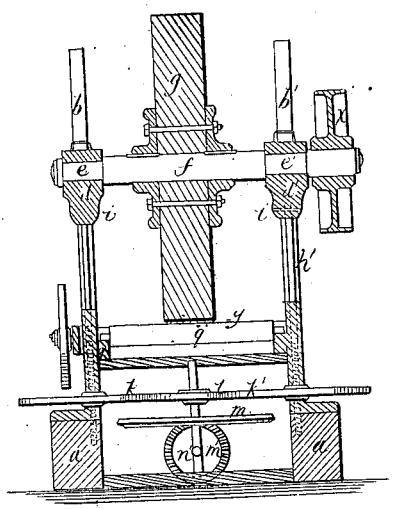

Figure 1 is a side elevation of my machine viewed from the right-hand side. Fig. 2 is a side elevation viewed from the left-hand side. Fig. 3 is a longitudinal vertical section of my machine through the center thereof. Fig. 4 is a transverse vertical section of my machine through $x\ x$, Fig. 1.

In the several figures like letters of reference denote similar parts.

The ordinary mode of grinding and polishing long saws is to press them by hand on the periphery of a grindstone which revolves rapidly by machinery, the saw being moved along over the stone by the workman as the grinding progresses, the degree of pressure of the saw on the stone being regulated by the operator bearing down with more or less of the weight of his body upon the saw. This mode of operation is liable to many serious objections. The grindstones, not being of uniform hardness throughout, tend naturally to wear away more rapidly at the soft places than elsewhere, and as the saw is laid upon the stone and pressed down upon it the stone very soon acquires an uneven surface, the hard places projecting beyond its surface where the stone is more abraded. As soon as this inequality increases so as to impair the accurate rotundity of the stone to any considerable degree it becomes necessary to chip off the hard projections and dress down the stone to a true circle, which causes a great waste of the stone and considerable expense and loss of time.

Another mode of grinding saws is to place them on a horizontal table or bed, to which the saw is secured by pins or clamps, the bed and saw traversing back and forth under the grindstone, which revolves on its axis above it. This mode has also serious objections, the chief of which are, the impossibility of moving the saw sidewise under the stone, according as the back or edge needs most grinding, and the trouble of securing the saw-plate to the bed and removing it when it requires to be turned, the rising of the saw from the bed or table during the process of grinding caused by its elongation from the heat created by the friction of the stone and its being confined by clamps at the ends, and the uneven surface produced by the washing of sand from the stone getting between the bed-plate and the saw. It is also almost impossible in practice to keep the bed or table so accurately horizontal and perfectly level as that the distance between the grinding-surface of the stone and the bearing part of the table (which is constantly changing) shall be so entirely uniform that there shall be no perceptible variation in thickness of a long saw-plate.

By both of these methods it is very difficult to make the saws of uniform thickness throughout their entire length, whereas uniformity of gage is a very important desideratum, and as cast-steel saw-plates are almost invariably thicker at one end than at the other before being manufactured into saws, it is a matter of great nicety not only to remove the scale and polish the metal but also to grind it down to a uniform gage.

By my machine I have succeeded in overcoming all these difficulties, and I not only perform the work of grinding and polishing saws much more expeditiously than by the old process, and effect a great saving in the grindstones and secure uniformity of gage, but I am enabled to regulate the gage to any required thickness of plate, and also to grind the saw so as to reduce its thickness at the back more than at the teeth, so as to give it clearance and prevent friction in the use of the saw. These important results I accomplish, chiefly, by using a rest or bearing-roller of comparatively small diameter, so as to give a small bearing-surface, said roller having its axis in the same vertical plane as that of the grindstone, whereby I obtain a bearing-surface, which (if the roller be accurately cylindrical) is unvarying in its distance from and parallelism with or inclination to the surface of the grindstone, and which, as it constantly revolves, is kept free from the accumulation of sand by the water always used in the operation of grinding.

To enable others skilled in the art to construct and use my improved machine, I will proceed to describe it construction and operation.

In the drawings, $a$ is the rectangular frame or bed of the machine, from the opposite sides of which rise two strong standards, $b\ b'$, each of which has a vertical slit, $c$, extending from the top downward a sufficient distance so as to raise and lower the pillar-blocks $d\ d'$ or boxes which carry the journals $e\ e'$ of the shaft $f$, to which the grindstone $g$ is secured.

The journal-boxes $d\ d'$ are made with a deep groove on each side, to receive the face of the standards $b\ b'$ on each side of the slit $c$, so that one journal-box, $d$, may slide up and down in the slit of each standard $b$, as between ways.

The grindstone-shaft $f$ is placed horizontally across the machine between the journal-boxes $d\ d'$, in which it revolves, and the grindstone is attached to the shaft $f$ midway between the standards $b\ b'$, at about the center of the machine. The grindstone is circular, with a plane face or periphery parallel to the axis of the shaft $f'$.

The journal-boxes carrying the grindstone are each attached to and supported by an upright iron rod, $h$, placed in the center of the slit $c$, in which slides the journal-box, to which rod it is attached at its upper end by a pin, $i$. The lower part of each rod $h$ has a screw cut in it, which takes into a female screw in the center of a large cog-wheel, $k$, one such cog-wheel $k$ being connected with each rod $h$, and thus the central part of the cog-wheels $k\ k'$ resting upon their respective standards $b\ b'$, as seen in Figs. 2 and 4, sustain the weight of the grindstone. The cog-wheels project each through a narrow opening made for that purpose near the base of its standard. The two cog-wheels $k\ k'$ are on the same horizontal plane, and between them, connecting them together, so as to cause them to rotate in the same direction, is a pinion, $l$. The cog-wheels $k\ k'$ being of the same diameter, and the pitch of the screws on the rods $h\ h'$ being equal, the turning of the cog-wheels $k\ k'$ by the pinion $l$ causes the rods $h\ h'$ to rise or descend equally, thus raising or lowering the journal-blocks $d\ d'$ uniformly and preserving the exact horizontal position of the grindstone-shaft which is elevated or depressed by turning the pinion $l$. The revolution of the pinion $l$ in either direction is effected by the bevel-wheels $m\ m'$, one attached to the shaft of the pinion $l$ and the other to a horizontal shaft, $n$, which terminates at the rear end of the machine in a crank, $p$.

Immediately under the axis of the grindstone and parallel with the shaft $f$ is a horizontal roller, $q$, which extends across the machine, its journals resting on blocks $r\ r'$, projecting from the inside of the standards $b\ b'$, (see Fig. 4.) This roller has no other motion than that on its axis caused by the passage of the saw over it, and serves as a rest for the saw-plate, sustaining the pressure of the grindstone upon the saw, the degree of which is regulated by the depression of the journal-boxes $d\ d'$ in the manner described.

At a suitable distance in front and rear of the rest or roller $q$ are placed a pair of horizontal friction feed-rollers, $s\ s\ s'\ s'$, the pressure of which is regulated by the set-screws $t\ t'$, so as to suit different thicknesses of steel plate. The upper surface of the lower feed-roll of each set is in the same horizontal plane as the upper surface of the rest or roller $q$ under the grindstone, so as to keep the saw perfectly straight. The lower roll of each pair of friction-rolls has a cog-wheel, $u\ u'$, attached to its axis, and these are connected together by a train of pinions, $v\ v$, and cog-wheel $w$, so as to cause them to revolve in the same direction and with the same speed, a regular motion being communicated to them by the crank $x$. The two friction-rollers $s\ s$ in each set are geared together by pinions $a'$.

The operation of my machine is as follows: The grindstone is adjusted to the proper height, so that its periphery as it revolves over the rest-roller $q$ will touch and grind the saw-plate, (marked $y$ in the drawings,) which adjustment is effected by turning the crank $p$ so as to raise or lower the stone. The grindstone is caused to revolve by power applied to the pulley $z$ on the shaft $f$. The feed-rollers $s\ s\ s'\ s'$ are set in motion by the crank $x$ and train of gearing-wheels, and revolve in such a direction as to cause the saw to pass forward, while the grindstone revolves in contact with it in the opposite direction. As the center of motion of the grindstone is fixed, its shaft $f$ being held in the position in which it was set by the rods $h\ h'$, the grindstone will wear uniformly at all points, which would not be the case if it rested on the saw with its bearings loose, so that it could rise and fall. As the stone gradually wears away the bearings of the journals of the shaft $f$ are lowered by turning the rods $h\ h'$ by means of the crank $p$.

If it is desired to grind down the back of the saw-plate thinner than the teeth it may be done by giving the rest-roller $q$ a slight inclination.

If preferred, the rest-roller $q$, instead of turning freely in its bearings, may be attached to the cog-wheel $w$, forming one of the train of wheels connected with the feed-rollers $s\ s\ s'\ s'$, in which case it will revolve with them, and should be of the same diameter.

The position of the rest-roller $q$ under the grindstone $g$, and with its axis in the same vertical plane as the axis of the grindstone-shaft $f$, in connection with the mode of hanging the stone and elevating or depressing it, enables me to make an aperture or passage of any required depth to which any metallic plate passed between the stone and the rest is made to conform, the stone reducing it to the gage thus established. My apparatus may be used for grinding and polishing not only long saws, but other sheets or plates of steel or other metal which require to be dressed and polished.

Having thus described my improved machine for grinding and polishing saws, what I claim as new, and desire to secure by Letters Patent, is—

In machines for grinding and polishing long saws, the arrangement of a grindstone supported on adjustable bearings, so as to be raised or lowered at pleasure in the manner described, with a rest-roller of small diameter having its axis parallel to that of the grindstone, and with one or more pairs of feed-rollers having pressure-screws or their equivalent, so as to hold and guide the saw in its passage under the stone, such feed-rollers being geared together, and also connected by gearing with the rest-roller, and having a positive and continuous motion on their axes in such direction as to feed the saw-plate forward either with or against the motion of the revolving grindstone, substantially in the manner and for the purposes hereinbefore set forth.

In testimony whereof, I, the said WILLIAM J. LIPPINCOTT, have hereunto set my hand.

WM. J. LIPPINCOTT.

Witnesses:
F. M. MAGEE,
A. S. NICHOLSON.